Sept. 13, 1955   R. J. GRATTAN   2,717,973
WARNING LIGHT
Filed Dec. 5, 1952

Roger J. Grattan
INVENTOR.

BY *Clarence A. O'Brien*
and *Harvey B. Jackson*
Attorneys

United States Patent Office 2,717,973
Patented Sept. 13, 1955

2,717,973

WARNING LIGHT

Roger J. Grattan, Missoula, Mont.

Application December 5, 1952, Serial No. 324,180

1 Claim. (Cl. 313—111)

This invention relates to a warning light adapted to be used in association with the head lights of an automotive vehicle and has for its particular object the provision of an apparatus for warning vehicular and pedestrian traffic that an emergency condition exists in a particular vehicle.

Many States now enforce laws requiring motorists to have directional signal devices installed in their automotive vehicles. Further, the necessity for parking lights, automatically controlled brake operated stop lights, and the like require a large number of individual light sources to be installed necessitating the positioning of various numbers of lenses along the front and rear ends of the vehicle. It is therefore another object of this invention to provide means for associating warning signals with the head lamps of an automobile to thus decrease the number of lenses marring the front end of the vehicle so as to enhance the opportunity for beautifying the vehicle, while decreasing the likelihood of flying glass and the expensive repairs should an accident occur.

The construction of this invention features the use of a cylindrical casing which extends substantially perpendicular to the axis of the reflector. The casing is adapted to contain a source of light and to direct the rays of the light in a path substantially normal to the rays admitted from another light source secured along the axis of the reflector. Thus, the light rays from the source of light in the casing will intermingle with the light rays emanating from the source of light carried by the reflector.

Still further objects of the invention reside in the provision of a warning light attachment for a head light that is strong, durable, highly efficient in operation, simple in construction and manufacture, and relatively easy to install.

Figure 1:
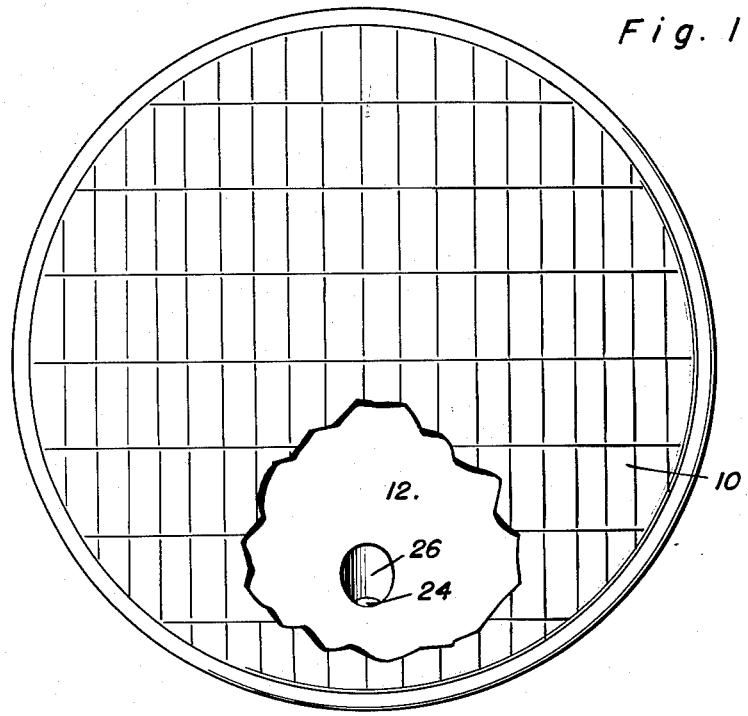
Figure 2:
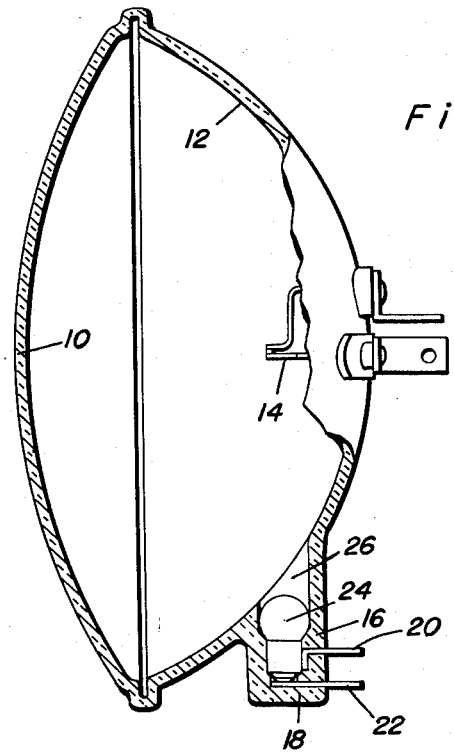

These together with the various ancillary objects of the invention which will become apparent as the following description proceeds, are attained by this warning light, a preferred embodiment of which has been illustrated in the accompanying drawings, by way of example only, wherein:

Figure 1 is a front elevational view of the head light assembly with parts being broken away to show the construction of the invention in greatest detail; and, Figure 2 is a vertical sectional view of the head light construction showing the cylindrical casing as integrally formed with the reflector.

With continuing reference to the accompanying drawings wherein like reference numerals designate similar parts throughout the various views, reference numeral 10 designates a lens forming a portion of a head light assembly which also includes a reflector 12 to which a suitable light source 14 is attached substantially along the axis of symmetry. This assembly forms the conventional "sealed beam" head light now in use on most automotive vehicles.

A casing 16 having cylindrical side walls and a bottom wall 18 is either integrally molded with the reflector 12 or attached thereto and suitable conductors 20 and 22 extend inwardly thereto to operatively connect a light bulb 24 to a source of power to enable the bulb 24 to be a source of illumination. It is to be noted that the lamp 24 is positioned below the light source 14 and between the origin of this light source on the lens 10. As can be readily seen, the bulb 24 is received within a recess 26 in the casing 16 and the walls of the casing will direct the rays emitted from the lamp 24 upwardly. Hence, these rays will readily intermingle with the rays emitted by the lamp source 14.

In operation, under ordinary circumstances, the light emanating from the light source 14 would appear similar to any usual and conventional head light and would have the conventional white beam. In emergencies, the separate source of light emanating from the lamp 24 would be activated and will be then flashed onto the white beam of the light and would thus color the entire illumination, depending only on the color of the light emitted from the bulb 24. Obviously, through suitable and proper operative connections, the lamp 24 could replace the present parking lights, which are also used as turn indicators. The lamp 24 could be wired so as to flash the lamp 24 off and on on turns whether or not the illuminating source 14 were turned on. Furthermore, since the lamps 24 are of smaller capacity than the head lights 14, they could readily serve as parking lights providing a distinctive warning illumination over a greater surface.

Since from the foregoing, the construction and advantages of this warning light are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to that fall within the scope of the appended claim.

What is claimed as new is as follows:

A warning light in combination with a headlight of sealed beam construction having a parabolic reflector, a light source carried by said reflector, and a lens integrally formed with said reflector, said warning light comprising a closed hollow cylindrical casing integrally formed with said reflector and opening into said reflector, a colored bulb mounted in said cylindrical casing, said reflector having a horizontally extending axis, said cylindrical casing having a vertically extending axis, the axis of said cylindrical casing extending substantially normal to the axis of said reflector, said cylindrical casing being positioned below said light source and between said lens and said light source said colored bulb emitting light rays of a different color from the light rays emitted by said light source in a direction substantially perpendicular to the light rays emitted by said light source.

References Cited in the file of this patent

UNITED STATES PATENTS

| 1,342,215 | Hawthorne | June 1, 1920 |
| 1,347,886 | Arenberg | July 27, 1920 |

FOREIGN PATENTS

| 309,672 | Great Britain | Apr. 18, 1927 |